United States Patent [19]

Nason et al.

[11] Patent Number: 4,656,202

[45] Date of Patent: Apr. 7, 1987

[54] ACRYLATED CELLULOSIC FURNITURE COATINGS

[75] Inventors: Dale L. Nason; Neil A. Wilson, both of Louisville, Ky.; Richard L. Gray, Columbus, Ohio

[73] Assignee: Reliance Universal, Inc., Louisville, Ky.

[21] Appl. No.: 770,638

[22] Filed: Aug. 28, 1985

[51] Int. Cl.$^4$ .......................... C08F 2/50; C08F 26/02; C08B 3/18

[52] U.S. Cl. ........................................ 522/89; 522/77; 522/99; 428/425.1; 526/238.21

[58] Field of Search ............................................ 522/89

[56] References Cited

U.S. PATENT DOCUMENTS

| | | | |
|---|---|---|---|
| 3,749,592 | 7/1973 | Gaske | 522/89 |
| 3,993,614 | 11/1976 | Carlson | 427/393 |
| 4,009,307 | 2/1977 | Erikson et al. | 427/377 |
| 4,148,987 | 4/1979 | Winey | 526/316 |
| 4,151,056 | 4/1979 | Park | 522/89 |
| 4,171,387 | 10/1979 | Fogle | 427/54 |
| 4,178,271 | 12/1979 | Busch | 522/89 |
| 4,212,928 | 7/1980 | Arney | 526/317 |
| 4,233,425 | 11/1980 | Tefertiller | 522/96 |
| 4,264,709 | 4/1981 | Newland | 522/89 |
| 4,287,323 | 9/1981 | Tefertiller | 522/96 |
| 4,301,231 | 11/1981 | Atarashi | 522/89 |
| 4,308,119 | 12/1981 | Russell | 522/89 |
| 4,343,919 | 8/1982 | Tefertiller | 522/90 |
| 4,344,982 | 8/1982 | Chen | 427/44 |
| 4,378,411 | 3/1983 | Heilmann | 428/500 |
| 4,400,441 | 8/1983 | Minnis | 528/514 |
| 4,404,239 | 9/1983 | Grunewalder | 427/393 |
| 4,421,782 | 12/1983 | Bolgiano | 427/53.1 |
| 4,444,806 | 4/1984 | Morgan | 427/46 |
| 4,477,548 | 10/1984 | Harasta | 430/14 |
| 4,481,258 | 11/1984 | Sattler | 428/371 |
| 4,510,290 | 4/1985 | Kirchmayr | 522/89 |
| 4,528,307 | 7/1985 | Fuhr | 523/440 |
| 4,565,857 | 1/1986 | Grant | |

OTHER PUBLICATIONS

Affidavit of Richard D. Howells under, 37 C.F.R. 1.132.

Primary Examiner—John C. Bleutge
Assistant Examiner—A. H. Koeckert
Attorney, Agent, or Firm—Donald L. Cox

[57] ABSTRACT

This invention involves a unique wood and furniture coating composition comprising about 50 to about 85% by weight of an acrylated cellulosic, about 15 to about 45% by weight of an acrylated oligomer about 0.1 to about 10% by weight of a ultraviolet photoinitiator and sufficient solvent to render the resulting solution handleable under processing conditions. The resulting coating may be applied by a unique process that involves spraying the coating over a base coated wood substrate, flashing the solvent off, rubbing, sanding or otherwise processing the coating and then ultraviolet curing the coating by subjecting the coating to ultraviolet curing conditions. The resulting coating possesses excellent cured state film properties and good chemical resistance. Its film properties are at least equivalent to prior art cellulose nitrate coatings but it is far superior to these coatings in terms of its chemical and water resistance. In comparison to prior art urea/formaldehyde curable systems, the instant invention provides far superior processing and film appearance properties.

10 Claims, No Drawings

ACRYLATED CELLULOSIC FURNITURE COATINGS

BACKGROUND OF INVENTION

1. Field of Invention

This invention relates to synthetic wood coatings. More particularly this invention relates to cellulosic based wood coatings which exhibit superior chemical resistance properties when compared to prior art cellulosic coatings and superior film appearance properties when compared to prior art thermoset coating compositions.

2. Prior Art

In the prior art there are two basic types of furniture coatings. The first type of coating is based upon a cellulosic such as a cellulose nitrate lacquer. Prior art cellulosics exhibit excellent finish properties and may be polished to a high gloss after the coating is applied. In addition, cellulose nitrate based coatings are relatively inexpensive, easy to use, easy to apply and are particularly easy to repair. If, after the coating has been applied but before it is shipped by the manufacturer, it is discovered that small surface imperfections have been caused such as by nicking or scraping, it is quite easy to repair these surface defects. However, a major disadvantage of the prior art cellulose nitrate furniture coatings is that they are quite susceptible to water spotting and are attacked by many different types of chemicals. Thus, prior art wood coatings based upon cellulose nitrate produce excellent finishes which are, however, subject to marring, scratching and water spotting. If the ultimate user does not take care to insure that water, ketchup or other food products are not left standing on the coatings, such coatings may be permanently marred or discolored.

One solution in the prior art to the water and chemical resistance problems exhibited by cellulose nitrate lacquers has been to employ thermosetting synthetic coating compositions of the alkyd/urea type. These coatings are based upon fatty acids, polycarboxylic acids and polyols and are cured through the use of acid catalyzed urea-formaldehyde curing agents. However, the alkyd/urea catalyzed wood coatings of the prior art exhibit several deficiencies. While these coatings possess excellent mar, stain, scratch and water resistant properties which provide longer useful lives, under most conditions of furniture use, the coatings, even immediately after application and curing, do not have the excellent appearance properties shown by cellulose nitrate lacquers. In particular, alkyd/urea catalyzed furniture coatings do not exhibit the rich depth of image which is exhibited by prior art cellulose nitrate lacquers that have been rubbed and polished.

In the marketplace, cellulose nitrate lacquer coatings are viewed by most consumers as being preferred from a visual standpoint to alkyd/urea catalyzed coatings. However, in the home the alkyd urea catalyzed coating compositions have been preferred.

One final problem of the alkyd urea catalyzed coatings is that once the coating is scratched or marred it is quite difficult, even in the factory, to repair the coatings so that the repair is not readily discernable. With cellulose nitrate coatings, on the other hand, factory repair is readily accomplished and it is often virtually impossible to detect a repaired coating.

Thus it is the object of this invention to prepare improved wood coatings.

It is another object of this invention to prepare improved furniture coatings.

It is yet another object of the invention to prepare wood and furniture coating compositions which exhibit improved water and chemical resistance properties over prior art coating compositions.

It is another object of this invention to prepare wood and furniture coatings which have improved chemical and water resistance properties, but which at the same time maintain film gloss properties equivalent to the properties of cellulose nitrate coating compositions.

It is another object of this invention to prepare coating compositions which may readily be repaired but which exhibit excellent water and chemical resistance properties.

These and other objectives are obtained by preparing the compositions described in this invention.

SUMMARY OF INVENTION

Disclosed herein is a wood or furniture coating composition comprising about 50 to about 85% by weight of an ultraviolet curable (meth)acrylated cellulosic polymer, about 15 to about 45% by weight of an ultraviolet reactive, polyacrylated oligomer, from about 0.1 to about 10% by weight of an ultraviolet photoinitiator, and sufficient solvent to permit application of the coating to the desired substrate.

The resulting coating compositions may be applied as furniture coatings by a unique process which is disclosed herein. In this process, the above coating is first spray applied to the desired substrate, and the solvent is flashed off as with conventional cellulose nitrate coatings. The manufacturing process for the furniture is then completed and the coating is then cured by subjecting the coated furniture to an ultraviolet light.

DETAILED DESCRIPTION OF INVENTION

The first component of the instant invention is an ultraviolet curable acrylated cellulosic compound. More particularly, the first component is an acrylated urethane cellulosic compound. The word "acrylated" as used herein includes acrylated, methacrylated and ethacrylated materials to the extent that these materials when reacted with the cellulosic compounds as described hereafter are ultraviolet curable. The preparation of typical examples of these materials is found in Examples 1 and 2 hereof. The basic component used in forming the acrylated cellulosics of the instant invention is a cellulose acetate based material in which a portion of the hydroxyl groups have been reacted with a $C_2$–$C_6$ carboxylic acid. Examples of such material include cellulose acetate propionate, cellulose acetate butyrate, and the like. The preparation of these materials is well known in the art. The cellulose acetate carboxylate should have a sufficient number of free hydroxyl groups present to react with the isocyanatoacrylate to produce products having the acrylate equivalent weight as specified hereafter.

The resulting product which still maintains a substantial number of free hydroxyl groups is further reacted with an isocyanatoacrylate to produce a cellulose acetate carboxylate urethane. Among the isocyanatoacrylates are those having the general formula:

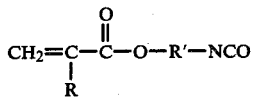

wherein R is H, CH₃ or CH₃CH₂ and R' is $C_1$ to $C_8$ alkyl. Examples of such isocyanatoacrylates include isocyanato ethyl acrylate and methacrylate, isocyanato propyl acrylate and methacrylate and isocyanatobutyl acrylate and methacrylate. For each hydroxyl group remaining on the cellulose acetate carboxylate, from about 0.3 to about 1.0 equivalents of isocyanate are reacted therewith.

In general, this reaction is conducted by simply mixing the cellulose acetate carboxylate and the isocyanate, a vinyl polymerization inhibitor and a catalyst for the hydroxy/isocyanate reaction. The mixture is then heated to a relatively low temperature, generally in the range of about 60° to 100° C., and held until the reaction is completed as demonstrated by the disappearance of isocyanate groups. The functionality and the equivalent weight of the final material depend upon the amount of hydroxyl groups present in the cellulose acetate carboxylate and on the extent of reaction with the isocyanatoacrylate. Preferably, the average acrylate equivalent weight of the finished material should be in the range of about 375 to about 650 preferably about 400 to about 600. To obtain this equivalent weight average, either a single acrylate containing cellulosic is employed or a mixture of acrylates may be employed, in which case the total weight average equivalent weight for all cellulosic acrylates is the governing factor.

Various catalysts for the hydroxyl/isocyanate reaction may also be employed. The suitable catalysts, and their effective concentrations, are well known to those skilled in the art. Included are organotin, cobalt, zinc and iron compounds as well as tertiary amines, phosphines and substituted naphthalenes. Specific examples include triethylenediamine, morpholine, N-ethylmorpholine, piperazine, triethanolamine, triethylamine, N,N,N',N', -tetramethylbutane-3-diamine, dibutyltin dilaurate, stannous octoate, dioctyltin diacetate, lead octoate, stannous oleate, stannous tallate, dibutlyltin oxide, etc. Generally, about 0.05 to about 5.0 percent by weight based on the total weight of the reactants of the catalyst is added to the reaction mixture.

During the reaction between the acrylate and the cellulosic compound, it is preferred to employ a polymerization inhibitor in conventional amounts (0.05 to 5 percent by weight based on the carboxylate contained) to insure that the acrylic based residuals do not polymerize. Examples of these inhibitors include hydroquinone, hydroquinone methylmono ether, catechol, 2,6-di-tertbutyl-4-methylphenol and the like, and so-called silane coupling agents are useful as the adhesion-improved including 3-methyacryloxypropyl trimethoxysilane, vinyl tris(2-methoxyethoxy)silane, N-(2-aminoethyl)-3-aminopropyl trimethoxysilane, 3-aminopropyl methyldimethoxysilane and the like.

Generally, the composition of the instant invention including the acrylated cellulosic materials are used in the form of their solvent solution. Many different types of solvents may be employed as long as the solvent is sufficiently volatile. Solvents useful for the cellulosic materials of the instant invention include virtually any of the organic solvents which are traditionally used in dissolving polymeric organic coatings. Thus, organic hydrocarbon solvents, organic esters, ethers, alcohols or ketones may be utilized. Preferred among the solvents are the oxygenated solvents such as the ketones, esters, ethers, ether esters, ether alcohols and alcohols. However, care should be taken when utilizing ketone type solvents for in some instances the cellulose acrylated materials of the instant invention are unstable in the presence of these materials. The boiling point or evaporation rate of the particular solvent which is employed depends upon a number of factors including predominately the flash temperature utilized to remove the solvents used with the coatings of the instant invention. Obviously, as the flash temperature and flash duration increase higher boiling solvents may be utilized. Most preferred among the solvents for the cellulosic acrylates of the instant invention is n-propylacetate.

The second component of the instant invention is a polymeric oligomer which contains more than one acrylate and preferably two or more acrylate or methacrylate groups per molecule. The acrylate containing oligomer may be chosen from many different types of materials. Examples of such materials include alkyds, polyesters, polyamides, and epoxy resins as well as acrylated polyurethane materials. These materials in general are prepared by reacting acrylic acid with a preformed polymeric material so as to provide pendant acrylic groups attached to the polymeric oligomer. Also included within these polymeric acrylate containing materials are materials prepared by reacting vinyl hydroxy material with a polyepoxide. Specific examples of such polymers include polyvinylacetate acrylate, N-acryloxymethylpolyamide, allyloxymethylpolyamide, acrylated polyester resins and acrylated resins prepared by reacting an acrylic acid with a polyisocyanate in the presence of a polyol. The resulting product is reduced to a handleable viscosity in a solvent of the type specified above.

The third important component of the compositions of the instant invention is an ultraviolet photoinitiator. The photosensitizer or photoinitiators fall into many classes and include compounds such as benzoin derivatives, as disclosed in German Patent No. F523401VC/396/, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-chlorobenzophenone, 4,4'-dimethoxybenzophenone, 4-chloro-4'benzylbenzophenone, 3-chloroxanthone, 3,9-dichloroxanthone, 3-chloro-8-nonylxanthone, 3-methoxyxanthone, 3-iodo-7-methoxyxanthone, thioxanthones, chlorinated thioxanthones, and the like.

Also included are alpha-acryloxime esters such as 1-phenyl-1,2 propane dione-2-(O-ethoxycarbonyl)oxime, benzyl ketones such as 2,2,diemethoxy-2,phenylacetophenone, hydroxy cyclo hexyl phenyl ketone and acetophenone and its derivatives such as diethoxy acetophenone and 2-hydroxy-2-methyl-1 propan-1-one. Also included are the acetophenone photosensitizers of the type described in U.S. Pat. No. 3,715,293, having the structure:

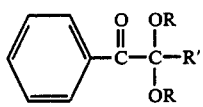

wherein R is an alkyl of from 1-8 carbon atoms, or an aryl with 6 carbon atoms, and R' is a hydrogen alkyl of from 1-8 carbon atoms, an aryl of from 6-14 carbon atoms or a cycloalkyl of 5-8 carbon atoms.

The alkylphenone photosensitizers having the formula:

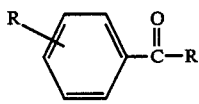

including halogen substituted products, the benzophenone type photosensitizer having the formula:

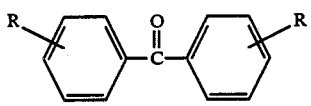

including halogen substituted products, the tricyclic fused ring type having the formula:

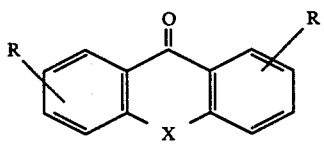

and the pyridyl type having the formula:

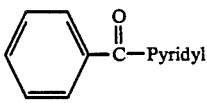

wherein the various substituents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1-4 naphthoquinone, 9-10-phenanthrenequinone, 1,2-benzanthraquinone, 2-3-benzanthraquinone, 2-methyl-1,4-napthoquinone, 2-3-dichloronaphthoquinone, 1-4 dimethylanthraquinone, 2-3 dimethylanthraquinone, 2-phenylanthraquinone, 2-3 diphenylanthraquinone, sodium salts of anthraquinone, alphasulfonic acid, 3-chloro-2-methylanthraquinone, and the like. Other photoinitiators which are also useful as described in U.S. Pat. No. 2,760,863 and include vicinal ketaldonyl compounds, such as diacetyl benzyl, etc., alpha ketaldonyl alcohols, such as benzoin, pivalion, etc., acyloin ethers, e.g., benzoin methyl and ethyl ethers, etc., alpha hydrocarbon substituted aromatic acyloins, including alphamethyl benzoin, alphaallyl benzoin, and alpha phenyl benzoin. Also included are the diacylhalomethanes, corresponding to one of the general formulas:

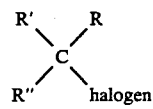

and

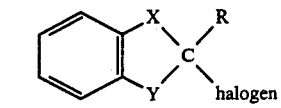

wherein halogen represents a halogen atom such as chlorine or bromine; R represents a hydrogen atom, a chlorine or bromine atom, or an acetyloxy group; R' and R" (same or different) represent a benzoyl group, a phenyl sulfonyl group, a carboxy phenyl sulfonyl group, a methylphenyl sulfonyl group. Included are 2-bromo-1,3-diphenyl-1,3-propane dione, 2,2-dibromo-1,3-indane dione, 2,2-dibromo-1,3-diphenyl-1,3-propane dione, 2-bromo-2-(phenylsulfonyl acetal phenone) and the like, as further described as U.S. Pat. No. 3,615,455.

Other photoinitiators are cataloged by G. Delzenne in *Industrie Chimique Belge*, 24 (1959), 737-764. Most preferred among the initiators are benzoin isobutyl ether, benzophenone, and 2-chlorothioxanthone.

Although not required, certain organic amines can be added to the photoinitiators above-described to further enhance the cure rate of the compositions of the instant invention in amounts up to about 5.00 percent, based on the weight, of the photoinitiator, preferably up to 0.50 percent, by weight. The amine activators can be primary, secondary, or tertiary, and can be represented by the general formula:

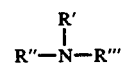

wherein R' and R" taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having 6 to about 12 ring carbon atoms; R''' has the same meaning as R' and R" with the exception that it cannot be hydrogen and that it cannot be aryl when both R' and R" are aryl. When taken together R" and R''' can be a divalent alkylene group ($-C_nH_{2n}-$) having from 2 to about 12 carbon atoms, a divalent alkenylene group ($-C_nH_{2n-1}-$) having from 3 to about 10 carbon atoms, a divalent alkadienylene group ($-C_nH_{2n-2}-$) having from 5 to about 10 carbon atoms, a divalent alkatrienylene group ($-C_nH_{2n-3}-$) having from 5 to about 10 carbon atoms, a divalent alkyleneoxyalkylene group ($-C_xH_{2x}-OC_xH_{2x}-$) having a total of from 4 to about 12 carbon atoms, or a divalent alkenyleneamionalkylene group

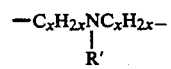

having a total of from 4 to about 12 carbon atoms. As previously indicated, the amines can be substituted with other groups; thus, the R', R" and R''' variables, whether taken singly or together, can contain one or more substituents thereon. The nature of such substitutents is generally not of significant importance and any substitutent group can be present that does not exert a pronounced deterrent effect on the ultraviolet crosslinking reaction.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-1-ethylhexylamine, dodecylamine, tridodecylamine, tri-1-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl-amine, tribenzylamine, triphenethylamine, benzyldimethylamine, benzyldihexylamine, trischlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4-picoline, morpholine, N-methylmorpholine, N-2-hydroxyethylmorpholine, N-2-ethoxyethylmorpholine, piperazine, N-methylpiperazine, N,N"-dimethylpiperazine, 2,2dimethyl-1,3-bis[3-(N-morpholinyl)-propionyloxy]propane, 1,5-bis[3-(N-morpholinyl)-propionyloxy]diethyl ether, and the like. The preferred organic amines are the tertiary amines, with the alkanol amines being most preferred. Specific preferred amine activators are triethanolamine, morpholine and methyldiethanolamine.

The final component of the instant invention is a solvent of the types described above.

In preparing the compositions of the instant invention the acrylated cellulosic compound should be present at about the 50-85% by weight level based upon the total curable solids present in the coating composition, preferably about 60-80%. The acrylated oligomer should be present at about the 15-45% by weight level, preferably about 20 to 40% by weight. Finally, the ultraviolet photoinitiator should be present at about the 0.1-10% by weight level, preferably about 1 to 7% by weight.

The non-volatile content of the compositions of the instant invention depends upon the method of application, the cure schedule and other factors of which are normally considered in formulating wood coatings, particularly furniture coatings. In general, where a spraying application process is employed, the non-volatile content should be in the range of about 15 to 25% by weight.

The coating compositions of the instant invention may be compounded with various conventional binders, reinforcing agents, fillers, plasticizers, flow control agents, pigments and the like.

The compositions of this invention may be applied by conventional coating application methods including spraying, brushing, dipping or the like. Preferably, the coatings are applied by spraying.

The coating compositions of the instant invention, as pointed out above, find particular utility in furniture and wood coating applications where it may be necessary to rework the coating after it has been applied in order to remove minor surface imperfections which arise during the coating process or arise as a result of mishandling or accidental scratchings, scuffing or damaging of the coated surface.

As pointed out above, the coating of the instant invention, prior to final ultraviolet curing, is readily reworkable. At the same time, the acrylated cellulose coatings of the instant invention are sufficiently tack-free after the solvent is removed that coated furniture can be handled in the factory without unduly damaging the finish. The advantage of the coatings of the instant invention is that after manufacturing and immediately before being sent to the customer or the the storekeeper, the coatings of the instant invention are fully cured by an ultraviolet curing process. Thus, the coatings of the instant invention provide the desirable gloss and reworking characteristics of cellulose nitrate coatings, while at the same time, after ultraviolet curing, maintain the cured state, chemical resistance properties of prior art alkyd/urea coatings.

The coating compositions of the instant invention are normally applied over one or more than one base coat. In the usual situation, a wood stain coat is applied to the sanded wood substrate followed by a first coat or wash coat and one or more than one air dried stain coats. In general, wash coats are employed to prevent penetration of the stain into the wood and to aid in causing the wood fibers to stand up for subsequent sanding. The compositions useful in preparing the stain and wash coats are generally well known in the art of furniture or wood coating. These coatings will not be discussed in detail here.

The wash coat is usually applied at an extremely low solids content and in most cases the binder is a thermosetting, acid catalyzed or ultraviolet curable resin. Particularly preferred resins include the alkyd resins, acrylic resins, and particularly cellulose acetate butyrate type resins which can be crosslinked with conventional urea/formaldehyde or melamine/formaldehyde low temperature curing agents. Typically, the solids content of the initial or wash coat is in the range of about 2 to about 12% by weight with the solvent being chosen from among the solvents specified above depending upon the final end use, processing conditions and particularly the temperatures employed in baking and curing the wash coat. In a typical coating system from about 5 to about 45% by weight of a curing agent is employed in conjunction with about 95 to about 55% by weight of the curable composition. In general, the amount of curing agent which is employed is determined taking into account the number of available hydroxyl groups present in the curable composition. Curing of the wash coat is catalyzed with an acid catalyst of the type normally employed in wood coating applications. Predominate among these catalysts are para-toluene sulfonic acid, ethane and methane sulfonic acid and other organic and inorganic acids.

In an alternative embodiment, a wash coat of the instant invention may be formed from the same material as is the top coat described above. If this process is employed, the wash coat is applied, the solvent is flashed off and the wash coat is then ultraviolet cured to provide the normal advantages of a wash coat.

After the application of the first base coat or wash coat, a sealer coat is applied to the wash coat. The sealer coat is generally of a higher solids content than is the wash coating ranging from about 10 to about 30% by weight. The sealer coat in general is formed from the same types of polymeric materials and curing agents as are employed to form the wash coat. The sealer coat, like the wash coat, employs an acid catalyzed curing agent of the same general composition or may be an ultraviolet curable composition. The sealer coat is air dried and sanded, and the top coat(s) is (are) applied.

Like the other compositions of the instant invention the top coat, as previously described, is spray applied, preferably to a thickness of about 0.8 to about 1.2 mils dry over the cured sealer coat(s). Usually from 1 to 3 layers of top coats are applied so as to produce a dry film thickness of about 2 to 3 mils.

After each layer of the top coat is applied it is subjected to a 5 to 25 minute air flash. After the last top coat is applied, the coating is air flashed and baked at low temperatures, i.e., less than about 150° F. for less than about 40 min.

The furniture top coated using the compositions of the instant invention may then be further manufactured, stacked or left unattended until final curing is desired. If during the course of manufacturing it is discovered that there has been a flaw, defect, scratch or other surface imperfection in the top coat of the instant invention, it is possible to repair the coating without difficulty since the oven baking does not totally cure the coating composition.

After the last steps in the manufacturing process are completed and all repairs have been made, the coating composition is then cured to a mar, chemical and stain resistant surface by subjecting it to ultraviolet radiation for a time sufficient to cure the coating. The process for ultraviolet curing of coatings and the equipment used therein is well known in the art and will not be described here. As used herein, the term "ultraviolet" includes energy curing by ultraviolet light, electron beam, actinic light, ionizing radiation and the like. The resulting product exhibits finish and repairable properties which are comparable to those of prior art cellulose nitrate coatings but with chemical resistance properties compared to those of prior art thermosetting coatings.

In the following examples all parts and percentages are by weight unless otherwise indicated.

EXAMPLE 1

To a dry one-quart, narrow-mouth, glass bottle were charged 83.2 g (0.25 equivalent) of cellulose acetate propionate (CAP-504-0.2 containing 41 percent propionate, 3 percent acetyl, 5.1 percent hydroxyl groups, with a falling ball viscosity of 0.2 second, available from Eastman Chemical Products, Inc.) in 154.5 g. n-propyl acetate, 39 g (0.25 equivalent) isocyanatoethyl methacrylate in 72.4 g propyl acetate, 60 mg of monomethyl ether of hydroquinone, and 120 mg of dibutyltin dilaurate. The bottle was purged with dry air, sealed, and placed in a water bath for heating and agitation, using a "Launder-O-Meter" for this purpose. After heating at 70° C. for 16 hours, the bottle was removed from the water bath and cooled to room temperature. Infrared analysis of a small sample of the reaction solution showed no unreacted isocyanate groups present.

Cellulose acetate propionate urethane-methacrylate was obtained in which 100 percent of the available hydroxyl groups of the starting cellulose had been converted to urethane-methacrylate functional groups. The calculated ethylenic unsaturation equivalent weight was 488.

EXAMPLE 2

To a dry one-quart, narrow-mouth, glass bottle were charged 181.2 g (0.54 equivalent) of cellulose acetate propionate (CAP-504-0.2 containing 41 percent propionate, 3 percent acetyl, 5.1 percent hydroxyl groups, with a falling ball viscosity of 0.2 second, available from Eastman Chemical Products, Inc.) in 336.5 g n-propyl acetate, 53.2 g (0.34 equivalent) of isocyanatoethyl methacrylate in 98.8 g n-propyl acetate, 50 mg of monomethyl ether of hydroquinone and 120 mg of dibutyltin dilaurate. The bottle was purged with dry air, sealed, and placed in a water bath for heating and agitation using a "Launder-O-Meter" for this purpose. After heating at 70° C. for 16 hours, the bottle was removed from the water bath and cooled to room temperature. Infrared analysis of a small sample of the reaction solution showed no unreacted isocyanate groups present.

Cellulose acetate propionate urethane-methacrylate was obtained in which 63 percent of the available hydroxyl groups of the starting cellulose ester had been converted to urethane-methacrylate functional groups. The calculated ethylenic unsaturation equivalent weight was 689.

EXAMPLE 3

A sealer coating was prepared by mixing 184 parts of toluene, 50 parts of xylene, 45 parts of AL-3801-X-60 castor oil alkyd available from the Reliance Universal, Inc. at 60 percent non-volatile in xylene. 75 parts of AM-1020-IX-60 isobutylated urea available from the Reliance Universal, Inc. at 60 percent solids in isobutanol and xylene, 69.7 parts of N-propanol, 108 parts of cellulose acetate butyrate CAB-553-0.4 available from Eastman Chemical Company, 190.6 parts of anhydrous ethanol, 160.0 parts of n-propyl acetate, 65 parts of butyl acetate, 40.7 parts of diacetone alcohol, 3 parts of DC-200 silicone solution (2.8 percent non-volatile in xylene) available from the Dow Corning Company, 3.0 parts of BYK-O foam control agent available from the Byk-Mallinckrodt Company and 6.0 parts of OK-412 (a silicone dioxide flattening agent) available from the DeGussa Chemical Company.

EXAMPLE 4

A wash coat was prepared by mixing 215.84 parts of toluene, 67.06 parts of xylene, 19.42 parts of AL-3801-X-60 (described in Example 3), 32.36 parts of AM-1020-IX-60 (described in Example 3), 18.19 parts of isobutanol. The above materials were mixed under agitation for 15 to 20 minutes and 46.60 parts of CAB-553-0.4 (described in Example 3) were added along with 215.27 parts of ethanol and 77.83 parts of N-propanol. This solution was mixed until smooth and 182.74 parts of N-propyl acetate, 73.53 parts of N-butyl acetate, 45.99 parts of diacetone alcohol, 1.29 parts of D.C. 200 silicone solution (described in Example 3), and 1.29 parts of BYK-O (described in Example 3) were added to the mixture and mixed under good agitation followed by the addition of 2.59 parts of OK-412 (described in Example 3).

EXAMPLE 5

A top coat was prepared by mixing 433.6 parts of the acrylated cellulosic prepared in Example 1, 46.3 parts of Chempol 19-4842 a silicone modified acrylated urethane oligomer available from the Freeman Chemical Corp., 7.4 parts of Irgacure 184, a photoinitiator available from the Ciba Company, 3.0 parts of DC 200 silicone solution, 26.3 parts of N-propyl acetate, 297.3 N-butyl acetate, 24.1 parts of di-isobutyl ketone, 160.7 parts of N-propanol, 1.0 parts of OK-412 and 0.3 parts of a polyethylene marproofing agent. The resulting coating had the following percentage of binder: 75.0 percent by weight—Example 1, 25.0 percent by weight Chempol 19-4842.

EXAMPLE 6

Oak based test panels were first fine sanded with 150 garnet paper. They were then stained and air dried for 5 minutes. Example 4 was catalyzed at the 1.1% by volume level with paratoluene sulfonic acid and applied by spraying on the stained test panels. The coating was air dried for 5 minutes and scuff sanded using 240 stearated paper. Next the coating was wipe stained and again air dried for 10 minutes, heated for 8 minutes at 125° F. and cooled for 10 minutes. Next the sealer coat, in Example 3, was catalyzed at the 2.6 percent by volume level using paratoluene sulfonic acid and spray applied to the wash coated panels. The coating was air dried for 10 minutes and scruff sanded using 240 stearated paper. A first top coating of Example 5 was spray applied to a thickness of approximately 0.5 to 1 mil dry and air dried for 10 minutes. A second coating of the same material was applied, air dried for 10 minutes, and a third coating of the same material was applied, air dried for 10 minutes and heated for 20 minutes at 125° F. followed by a 10 minute cooling cycle. The resulting dry coating was approximately 2 to 3 mils thick. The coating was then rubbed and polished. The test panel was ultraviolet cured using an ultraviolet lamp which provided 300 watts per inch which was located 4–6 inches from a conveyor belt moving at a speed of 35 ft per minute. The resulting coating exhibited excellent mar and chemical resistance and good depth of shine and gloss.

EXAMPLE 7

Example 5 is repeated except that the binder percentages are as follows: Example 1—35 weight percent, Example 2—35 weight percent, Chempol 19-4842 (described in Example 5) 30 weight percent. Example 6 is then repeated employing this new binder composition. The resulting coats when ultraviolet cured as specified in Example 6 exhibit excellent gloss and chemical resistance.

EXAMPLE 8

Example 5 is repeated except that the binder percentages are: 25 percent CMD 3201, an epoxy-based polyacrylate available from the Celanese Corporation, and 75 percent Example 1. Example 6 is then repeated employing this new binder composition. The resulting coats when ultraviolet cured as specified in Example 6 exhibit excellent gloss and chemical resistance.

EXAMPLE 9

The preceding example is repeated except that CMD 1701 an acrylic copolymer polyacrylate available from the Celanese Corporation is used in place of the CMD 3201. Example 6 is then repeated employing this new binder composition. The resulting coats when ultraviolet cured as specified in Example 6 exhibit excellent gloss and chemical resistance.

EXAMPLE 10

The preceding example is repeated except that Chempol 19-4826 is used in place of CMD 1701. Example 6 is then repeated employing this new binder composition. The resulting coats when ultraviolet cured as specified in Example 6 exhibit excellent gloss and chemical resistance.

EXAMPLE 11

The preceding example is repeated except that Chempol 19-4827 is used in place of Chempol 19-4826. Example 6 is then repeated employing this new binder composition. The resulting coats when ultraviolet cured as specified in Example 6 exhibit excellent gloss and chemical resistance.

EXAMPLE 12

The coating prepared in Example 6 was compared with a conventional nitrocellulose lacquer top coat and with a conventional alkyd/urea top coat with the results shown in the Table.

As can be seen from the Table, the Example 6 coating was superior in its sheen properties and cured state properties in comparison with both conventional nitrocellulose and alkyd/urea coatings.

TABLE

| | NITRO CELLULOSE LACQUER | | | | ALKYD/UREA THERMOSETTING COATING | | | | ACRYLATED CELLULOSIC (EXAMPLE 6) | | | |
|---|---|---|---|---|---|---|---|---|---|---|---|---|
| | 10° Sheen* | 60° Sheen** | Rubbed | | 10° Sheen | 60° Sheen | Rubbed | | 10° Sheen | 60° Sheen | Rubbed | |
| Stain Resistance | 3.9 | 4.8 | 4.2 | $\overline{4.3}$ | 5.3 | 4.3 | 3.8 | $\overline{4.5}$ | 8.1 | 5.5 | 5.3 | $\overline{6.3}$ |
| Scratch Resistance | 2 | 1 | 1 | $\overline{1.3}$ | 3 | .3 | 1 | $\overline{2.3}$ | 4.5 | 6 | 3 | $\overline{4.5}$ |
| Adhesion | 2 | 2 | 1 | $\overline{1.7}$ | 4 | 4.5 | 2 | $\overline{3.5}$ | 5 | 7 | 4 | $\overline{5.3}$ |

0 = Worst
10 = Best
*Evaluations performed on top coats formulated to a sheen of 10° as measured using a Gardner 60° gloss meter. Gloss was controlled by adding inert silicon dioxide flattening pigment.
**Evaluations performed on top coats formulated to a sheen of 60°.

What is claimed is:

1. An ultraviolet curable coating composition comprising about 50 to about 85 percent by weight of an acrylated cellulosic compound prepared by reacting an isocyanato acrylate with an hydroxyl containing cellulose acetate carboxylate such that after said reaction essentially no free isocyanate groups are present; about 15 to about 45 percent by weight of an acrylated oligomer; about 0.1 to about 10 percent by weight of an ultraviolet initiator and sufficient solvent to render the coating handleable under application conditions.

2. The composition of claim 1 wherein about 0.3 to about 1.0 equivalents of the isocyanato acrylate is reacted with each hydroxyl equivalent on the cellulose acetate carboxylate.

3. An ultraviolet curable coating composition comprising:
   (a) about 50 to about 85 percent by weight of an acrylated cellulosic compound prepared by reacting a hydroxy containing cellulose acetate carboxylate wherein the carboxylate contains from 1 to 4 carbon atoms with an isocyanatoacrylate having the general formula:

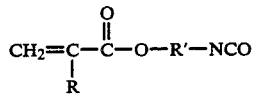

wherein R is H, $CH_3$ or $CH_2-CH_3$ and R' is $C_1-C_8$ alkyl and wherein about 0.3 to about 1.0 equivalents of isocyanate are reacted with each hydroxyl equivalent on the cellulose acetate carboxylate;
   (b) about 15 to about 45 percent by weight of an acrylated oligomer;
   (c) about 0.1 to about 10 percent by weight of added ultraviolet photoinitiator; and
   (d) sufficient solvent to render the coating handleable under application conditions.

4. The composition of claims 1 or 3 wherein the acrylated oligomer is selected from acrylated epoxides, acrylated acrylic copolymers, acrylated polyurethanes and acrylated polyesters.

5. The composition of claims 1 or 3 wherein the acrylated oligomer is an acrylated epoxide.

6. The composition of claims 1 or 3 wherein the acrylated oligomer is an acrylated acrylic copolymer.

7. The composition of claims 1 or 3 wherein the acrylated oligomer is an acrylated polyurethane.

8. The composition of claims 1 or 3 wherein the acrylated oligomer is an acrylated polyester.

9. The composition of claims 1 or 3 wherein the acrylated oligomer is a silicon modified acrylated oligomer.

10. The composition of claims 1 or 3 wherein the acrylated oligomer is a silicon modified acrylated polyurethane.

UNITED STATES PATENT AND TRADEMARK OFFICE

Certififcate

Patent No.4,656,202

Patented: Apr.7, 1987

On petition requesting issuance of a certififcate of correction of inventorship pursuant to 35 USC 256, it has been found that the above-identified patent, through error and without any decptive intent, improperly sets forth the inventorship. Accordingly, it is hereby certified that the correct inventoship of this patent is:

Dale L. Nason; Neil A. Wilson; Richard L. Gray; Philip T. Wong

Signed and Sealed this 26th Day of September 1989.

John Bleutge,
*Supervisory Patent Examiner*
*Art Unit 151*
*Patent Examining Group 150*